United States Patent

[11] 3,532,106

| [72] | Inventors | Christian Greune<br>Schongeising;<br>Hilbert Holzhauer; Karl Maier, Munich, Germany |
|---|---|---|
| [21] | Appl. No. | 728,424 |
| [22] | Filed | May 13, 1968 |
| [45] | Patented | Oct. 6, 1970 |
| [73] | Assignee | Motoren - und Turbinen - Union<br>Munich, Germany |
| [32] | Priority | June 10, 1967 |
| [33] | | Germany |
| [31] | | M 74341 |

[54] FUEL CONTROL UNIT FOR GAS TURBINES
4 Claims, 1 Drawing Fig.

[52] U.S. Cl. ...................................... 137/117,
137/20, 251/47, 251/51, 92/12
[51] Int. Cl. ...................................... G05d 13/06
[50] Field of Search ........................ 137/108,
20, 461, 117; 251/47, 48, 54

[56] References Cited
UNITED STATES PATENTS

| 1,501,331 | 7/1924 | Gulick | 137/245 |
|---|---|---|---|
| 2,915,076 | 12/1959 | Teumer | 137/20X |
| 3,007,514 | 11/1961 | Werts | 137/20 |
| 3,106,934 | 10/1963 | Rogers | 137/117 |
| 3,215,155 | 11/1965 | Oishi | 137/19X |
| 3,434,395 | 3/1969 | Londal | 137/117X |

*Primary Examiner*—William F. O'Dea
*Assistant Examiner*—William H. Wright
*Attorney*—Stephens, Huettig and O'Connell

ABSTRACT: The fuel metering valve for a gas turbine is controlled by a differential pressure piston which is joined to a differential pressure spring-loaded variable damping force piston.

Patented Oct. 6, 1970
3,532,106
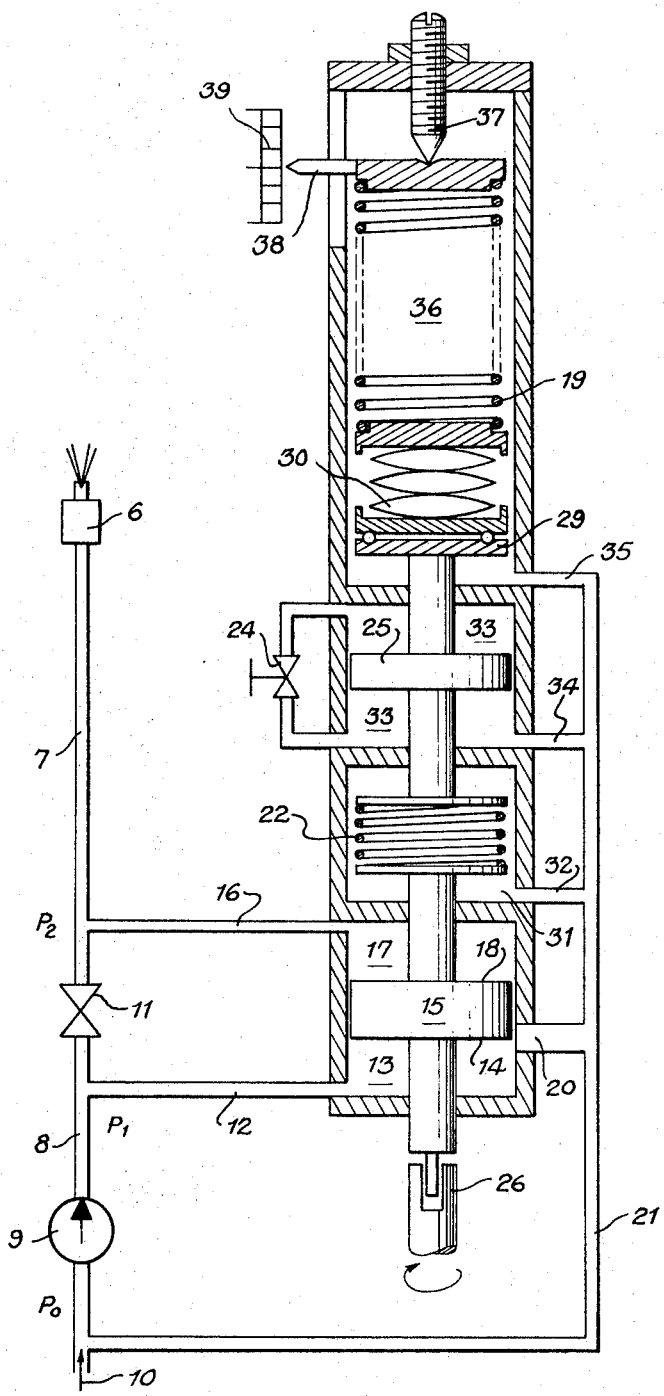
INVENTORS
Christian Greune
Hilbert Holzhauer
Karl Maier
BY
Stephens, Huettig and O'Connell
ATTORNEYS

FUEL CONTROL UNIT FOR GAS TURBINES

This invention relates to a differential pressure controller of a fuel control unit, especially for gas turbine jet engines, which enables the fuel quantity to be metered as a function of certain operating parameters as well as of the ambient conditions of the engine, whereby, in order to maintain a constant differential pressure at a metering valve, the excess fuel quantity can be bypassed by means of a springloaded differential pressure piston. Devices have become known which enable the differential pressures at a fuel metering valve to be kept constant, said devices effecting an analogous change of the pressure upstream of a metering valve as soon as there is a pressure change downstream of it. Such devices are P-controllers controlling the pressure difference developing at the metering valve. For stability reasons, however, these P-controllers will permit relatively great control variations and, thus, differential pressure variations which will impair accurate fuel metering.

German Pat. No. 1,190,758 discloses a device which is capable of eliminating undesired control variations occurring with P-controllers by means of a PI-controller. This known device, however, is of a very sophisticated design and requires a considerable installation space.

As compared to this already known control device, the object of this invention is to reduce the control deviations, which are unavoidable with P-controllers, to a negligible value, whereby the control device according to this invention, featuring approximately the properties of the known PI-controller, shall require only the constructional effort of a P-controller.

According to this invention, the object is obtained by arranging a damping piston with a variable damping force between the differential pressure springs associated with the differential pressure piston.

This variable damping force piston effects stabilization of the whole control system. A spring, arranged between damping piston and differential pressure piston, limits the action of the damping piston in cases of control variations of very high frequency and ensures leveling of high frequency variations with a small gain.

In a further embodiment of this invention, the damping force of the damping piston is variable by means of a throttling element which is connected to the cylinder of the associated damping piston.

The existence of this variable damping element as well as the type of arrangement selected for the differential pressure springs enable the rate of both springs to be kept very low and the time characteristics of a fuel control unit to be optimized in such a manner that, with a very small error, i.e. with high gain, no instability will occur, and that even high-frequency variations can be leveled.

In accordance with another feature of this invention, bimetallic shims are arranged between the differential pressure springs associated with the differential pressure piston and the damping piston which expand as the fuel is heated up, thus preloading the differential pressure springs to a higher value. This results in an increase of the differential pressures $P_1$ upstream and $P_2$ downstream of the metering valve and in the lower mass flow at the metering valve, due to the fuel being heated up, to be leveled.

Furthermore, the preloading of the differential pressure springs is adjustable as a function of the specific gravity of the fuel grade selected, which is effected by means of an adjusting screw located in the housing of the unit, said screw moving and retaining a differential pressure spring pointer against the action of this spring, whereby the spring pointer, at the same time, indicates the specific gravity of the fuel on a measuring dial.

In order to reduce and eliminate, respectively, the static friction of those major components of the unit which are subject to control movements, which will result in an increased control accuracy, this invention furthermore provides for a common rotational motion of the differential pressure piston as well as of the damping piston to be effected about their longitudinal axes with the aid of a spring arranged between the two pistons, whereby the bimetallic shim side of the damping piston is supported on said shims by means of a thrust bearing.

The means by which the objects of this invention are obtained are described more fully with reference to the accompanying schematic drawing which is a longitudinal cross-sectional view through the control unit.

The gas turbine fuel nozzle 6 is connected by pipes 7 and 8 to a fuel pump 9 which receives fuel from feed line 10. The pressure upstream of fuel pump 9 is designated $P_0$ and the pressure downstream of the pump is designated $P_1$. Thereafter, the fuel is metered to fuel injection nozzle 6 via metering unit 11, the pressure downstream of the metering point being designated $P_2$. It is the purpose of the fuel control device to maintain the differential pressure $P_1 - P_2$ in pipe 8, upstream, and in pipe 7, downstream, of the metering unit. Through line 12, fuel flows to a cylinder 13 and applies pressure $P_1$ to face 14 of differential pressure piston 15. The fuel flowing through line 16 into annular chamber 17 applies pressure $P_2$ to face 18 of piston 15. At the same time, differential pressure springs 19 and 22 press against inner surface 18 of differential pressure piston 15, thus initially keeping differential pressure piston 15 in equilibrium. If, for example, pressure $P_2$ at metering point 11 is reduced, piston 15 will move upwardly, opening bypass port 20. Thus sufficient fuel is allowed to flow through line 21 back to feed line 10 as to permit pressure $P_1$ in cylinder 13 to be decreased to such a level as is required to restore the initial state of equilibrium. By means of a damping piston 25, the damping effect of which can be varied with the aid of an adjustable throttling element 24, it is possible to optimize the time characteristics of the control device in such a manner that, with a very small error, i.e. with high gain, no instability will occur and that even high-frequency variations can be leveled.

In order to eliminate the static friction of differential pressure piston 15 and damping piston 25, both pistons are rotated, this rotation being initiated by shaft 26. For this purpose, spring 22 is designed in such a manner as to transmit the rotation of differential pressure piston 15 to damping piston 25. For reasons of pressure balance, cylinders 31, 33 and 36 are connected to line 21 via lines 32, 34 and 35. Damping piston 25 is supported on bimetallic shims 30 by means of a thrust bearing 29; these bimetallic shims expand with increasing fuel temperature, preloading differential pressure springs 19 and 22 to a higher value. This causes the differential pressure $P_1 - P_2$ to rise and the fuel flow which, due to the heating up of the fuel, has been reduced at metering valve 11, to be leveled. By means of an adjusting device 37, it is possible to change the preload of differential pressure spring 19 as a function of the specific gravity of the fuel used. The specific gravity of the fuel, to which the unit is adjusted by means of adjusting device 37, is indicated by pointer 38 on dial 39.

We claim:

1. A differential pressure fuel control means to regulate the flow of fuel to a gas turbine jet engine or the like, including a fuel line providing for a flow of fuel under pressure, a metering valve in said fuel line having an upstream and a downstream side, differential piston means operating in a cylinder the first end of which is connected to the fuel line on the upstream side of said metering valve, the second end of said cylinder being connected to the fuel line at the downstream side of said metering valve, a coaxial piston rod extending beyond said cylinder ends, first spring means biasing said piston rod of said differential piston means toward said first cylinder end, variable damping force piston and cylinder means including a piston rod positioned coaxially of said differential piston means, said first spring means biasing said piston rod of said variable damping force piston means away from said first cylinder end of said differential piston means, second spring means biasing said variable damping force piston means toward said first spring means, and valve means operated by movement of said differential piston to bypass fuel from said upstream side of said metering valve to adjust the pressure between the upstream and the downstream sides of the said metering valve.

2. A fuel control unit as in claim 1, further comprising throttling means 24 joined to said variable damping force piston means 25 for varying the damping force on said piston means 25.

3. A fuel control unit as in claim 2, further comprising bimetallic shim means 30 engaging said second spring means for preloading said spring means to a higher value by expansion upon an increase in fuel temperature.

4. A fuel control unit as in claim 3, further comprising means for rotating said differential piston means and said damping force piston means through said differential spring means, and thrust bearing means 29 between the damping piston means and said shim means.